United States Patent [19]

Obama et al.

[11] Patent Number: 4,907,462
[45] Date of Patent: Mar. 13, 1990

[54] TORQUE SENSOR

[75] Inventors: Masao Obama, Yokosuka; Masaaki Kikuchi, Tokyo, both of Japan

[73] Assignee: Kabushiki Kaisha Toshiba, Kawasaki, Japan

[21] Appl. No.: 298,012

[22] Filed: Jan. 18, 1989

[30] Foreign Application Priority Data

Jan. 22, 1988 [JP] Japan ................................ 63-12014

[51] Int. Cl.$^4$ ................................................ G01L 3/10
[52] U.S. Cl. ................................................ 73/862.36
[58] Field of Search .......... 73/862.36, 862.69, DIG. 2

[56] References Cited

U.S. PATENT DOCUMENTS 1,586,877  6/1926  Buckley .......................... 73/862.69
4,627,298  12/1986  Sahashi et al.
4,760,745  8/1988  Garshelis ........................ 73/862.36

FOREIGN PATENT DOCUMENTS 6228413  1/1983  Japan .

Primary Examiner—Charles A. Ruehl
Attorney, Agent, or Firm—Oblon, Spivak, McClelland, Maier & Neustadt

[57] ABSTRACT

In a torque sensor of a noncontact type, a pair of amorphous magnetic ribbons are bonded to a shaft to which a rotary torque is applied. A pair of coils are wound around the shaft and an alternating magnetic field is applied from the coils to the magnetic ribbons along the axis of the shaft. A permanent magnet and yokes are located around the shaft and a bias magnetic field is also applied from the magnetic to the magnetic ribbons through the yokes.

23 Claims, 4 Drawing Sheets

TORQUE SENSOR

BACKGROUND OF THE INVENTION

1. Field of the Invention

The present invention relates to a torque sensor for sensing a torque applied to a shaft, by utilizing a magnetostriction effect.

2. Description of the Related Art

Various types of torque sensors for sensing a torque applied a shaft (hereinafter, called "shaft torque") are well known. For example, U.S. Pat. No. 4,627,298 (Sahashi et al.) discloses a torque sensor utilizing a magnetostriction effect of a magnetic metallic ribbon having an induced magnetic anisotropy, Japanese Patent Publication (Kokoku) No. 62-28413 discloses a torque sensor employing an amorphous magnetic metallic ribbon as a magnetic metallic ribbon and utilizing a magnetostriction effect of the amorphous magnetic metallic ribbon. In this type of torque sensor utilizing a magnetostriction effect of a magnetic metallic ribbon, a magnetic metallic ribbon having a large magnetostriction effect is fixed on the outer periphery a rotating shaft, and a coil is arranged near the metallic ribbon such that the coil does not contact the shaft. The permeability of the magnetic metallic ribbon, which is caused by a torque applied to the shaft, is changed. A resultant change in impedance of the coil or a change in induced voltage is detected. Based on the detection signal, the shaft torque is sensed. Thus, the torque can be sensed without bringing the sensor into contact with the shaft, and the sensor can be provided on a shaft which is already assembled in an apparatus. In addition, the direction of the torque applied to the shaft can easily be detected by suitably arranging on the shaft two or more magnetic metallic ribbons having induced magnetic anisotropy.

However, this type of torque sensor utilizing the magnetostriction effect of the magnetic metallic ribbon has the following problem. That is, the torque can be accurately sensed in a space free from an external magnetic field, e.g., in a laboratory. However, in a space having a external magnetic field which is variable, the sensitivity of detection varies depending on the external magnetic field. Thus, the torque cannot be sensed exactly. In addition, in the case where the shaft is made of a ferromagnetic body, the shaft is magnetized by the external magnetic field or a magnetic field produced by the coil of the torque sensor, and the magnetization of the shaft deteriorates the sensitivity of detection.

SUMMARY OF THE INVENTION

An object of the present invention is to provide a torque sensor which can maintain high detection sensitivity and can always sense a torque accurately.

Another object of the invention is to provide a torque sensor which can always sense a torque accurately with high detection sensitivity and with no influence from an external magnetic field.

Still another object of the invention is to provide a torque sensor which can always sense a torque accurately with high detection sensitivity, even if a shaft to be subjected to torque detection is made of a magnetic material.

The present invention can provide a torque sensor of a noncontact type for sensing a rotary torque applied to a shaft having an axis, the sensor comprising:

a first magnetic ribbon bonded to the shaft along the circumferential direction of the shaft, said ribbon comprising a magnetic material having an induced magnetic anisotropy in a direction of an angle $\alpha$ in respect to the axis of the shaft;

means for generating an alternative magnetic field along the shaft and applying the magnetic field to said magnetic ribbon;

means for generating a constant biasing magnetic field along the shaft and applying the biasing magnetic field to said magnetic ribbon; and means for detecting the magnetic fields passing through said magnetic ribbon to generate an output signal.

Further, this invention provides a torque sensor of a noncontact type for sensing a rotary torque applied to a shaft having an axis, the sensor comprising:

a first amorphous magnetic ribbon bonded to the shaft along the circumferential direction of the shaft, said ribbon comprising a magnetic material having an induced magnetic anisotropy in a direction of an angle $\alpha$ in respect to the axis of the shaft;

means for generating an alternative magnetic field along the shaft and applying the magnetic field to said magnetic ribbon;

means for generating a constant biasing magnetic field along the shaft and applying the biasing magnetic field to said magnetic ribbon; and means for detecting the magnetic fields passing through said magnetic ribbon to generate an output signal.

Furthermore, this invention provides a torque sensor of a noncontact type for sensing a rotary torque applied to a shaft which has an axis and is made of a magnetic material, the sensor comprising:

a first magnetic ribbon bonded to the shaft along the circumferential direction of the shaft, said ribbon comprising a magnetic material having an induced magnetic anisotropy in a direction of an angle $\alpha$ in respect to the axis of the shaft;

a second magnetic ribbon arranged close to said first magnetic ribbon and bonded to the shaft along the circumferential direction of the shaft, said second ribbon comprising a magnetic material having an induced magnetic anisotropy in a direction of an angle $-\alpha$ in respect to the axis of the shaft;

means for generating an alternating magnetic field along the shaft and applying the magnetic field to said magnetic ribbon;

means for generating a constant biasing magnetic field along the shaft and applying the biasing magnetic field to said magnetic ribbon; and means for detecting the magnetic fields passing through said magnetic ribbon to generate an output signal.

DETAILED DESCRIPTION OF THE PREFERRED EMBODIMENTS

Figure 1:
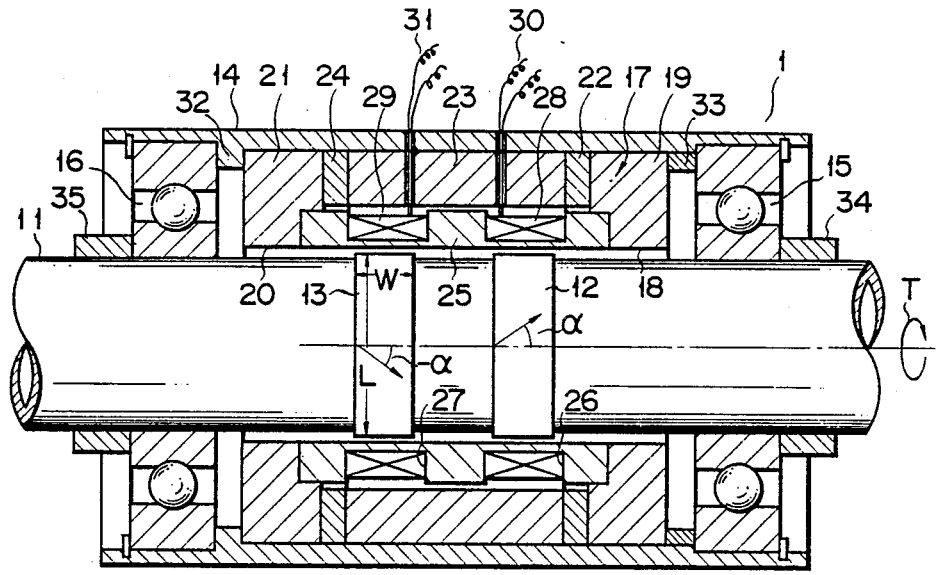
FIG. 1 shows a vertical cross section of a detection section of a torque sensor according to an embodiment of the present invention.
Figure 2:
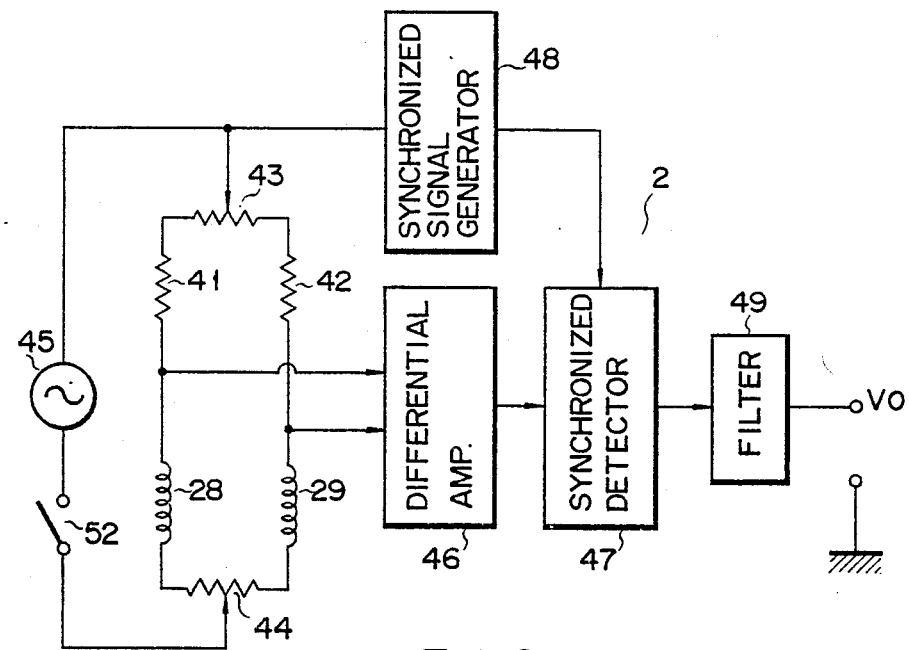
FIG. 2 shows a circuit structure of a signal processing section connected to the detection section shown in FIG. 1.

FIG. 1 shows detection section 1 of a torque sensor according to an embodiment of the present invention, and FIG. 2 shows signal processing section 2 connected to detection section 1. In FIG. 1, shaft 11 for transmitting a torque is made of a ferromagnetic material in a cylindrical shape. A pair of amorphous magnetic metallic ribbons 12 and 13 are bonded to shaft 11 around its outer periphery. First ribbon 12 has a uniaxial magnetic anisotropy. The direction of the magnetic anisotropy of first ribbon 12 is inclined to the axis of shaft 11 by an angle $\alpha$. Similarly, second ribbon 13 has a uniaxial magnetic anisotropy. The direction of the magnetic anisotropy of second ribbon 12 is inclined to the axis of shaft 11 by an angle $-\alpha$.

Shaft 11 is inserted into non-magnetic cylindrical housing 14 which is fixed on a stationary base. Amorphous magnetic metallic ribbons 12 and 13 are arranged in a space within housing 14. Shaft 11 is supported by bearings 15 and 16 are arranged at both end portions of the inner surface of housing 14. Biasing magnetic field applying source 17 for applying a biasing magnetic field along shaft 11 is fixed in a space within housing 14 which is defined by bearings 15 and 16. Biasing magnetic field applying source 17 comprises ferromagnetic ring-shaped yokes 19 and 21, ferromagnetic cylindrical yoke 23, and ring-shaped permanent magnets 22 and 24. Yokes 19 and 21 have pole-faces 18 and 20 which face the peripheral surface of shaft 11. Permanent magnets 22 and 24 and yoke 23 are arranged between a side face of a peripheral part of yoke 19 and a side face of a peripheral part of yoke 21. Permanent magnets 22 and 24 are magnetized in a direction along the axis of shaft 11. In biasing magnetic field applying source 17, a magnetic flux generated from ring-shaped permanent magnets 22 and 24 passes through any one of yokes 19, 21 and 23 and one of pole-faces 18 and 20, flows through shaft 11, and crosses amorphous magnetic metallic ribbons 12 and 13. Then, the magnetic flux returns to permanent magnets 22 and 24 through the other of pole-faces 18 and 20 and any of yokes 19, 21 and 23. Non-magnetic cylindrical coil bobbin 25 is clamped in the axial direction between a side face of an inner part of yoke 19 and a side face of an inner part of yoke 21. Circumferentially extending grooves 26 and 27 are formed in the outer peripheral surface of coil bobbin 25. Coils 28 and 29, which have the same number of windings and generated an alternating magnetic field for torque detection along shaft 11, are mounted in grooves 26 and 27. Coils 28 and 29 face amorphous magnetic metallic ribbons 12 and 13. Line terminals 30 and 31 of coils 28 and 29 are led to the outside through holes made in yokes 23 and housing 14. Yokes 19, 21 and 23, permanent magnets 22 and 24, coil bobbin 25, and coils 28 and 29 are fixed within housing 14 such that these elements are immovable in the axial direction in the following manner. At first, yoke 21 is engaged with engaging projection 32 formed on the inner face of housing 14. Then, permanent magnet 24 is mounted. Thereafter, coil bobbin 25 having coils 28 and 29 and yoke 23 having holes, into which line terminals 30 and 31 are inserted, are mounted within housing 14. Permanent magnet 22 and yoke 19 are mounted within housing 14. Finally, an outer race of bearing 15 is fixed on housing 14 via spacer 33 are guided to the outside through the hole of housing 14. In FIG. 1, reference numerals 34 and 35 indicate stop rings for fixing inner races of bearings 15 and 16.

As shown in FIG. 2, in signal processing section 2, a bridge circuit is constituted by coils 28 and 29 and resistors 41 and 42. Input terminals of the bridge circuit are connected through variable resistors 43 and 44 for balance adjustment and switch 52 to an output terminal of AC oscillator 45 for producing a high frequency voltage signal of, for example, 100 KHz. A node between coil 28 and resistor 41 and a node between coil 29 and resistor 42 are connected to differential amplifier 46. Thus, midpoint potentials of the bridge circuit are input to differential amplifier 46, and an output of differential amplifier 46 is supplied to synchronized detector 47. A high-frequency power source voltage generated from power source 45 is supplied, as a reference wave, to phase signal setting device or synchronized signal generator 48. A reference phase signal supplied from phase signal setting device 4 is sent to synchronized detector 47. Synchronized detector 47 detects and rectifies an output of differential amplifier 46 with the use of the reference phase signal. An output of synchronized detector 47 is smoothed by filter 49 and is output as DC output V0.

The operation of the torque sensor having the above structure will now be described.

Figure 3:
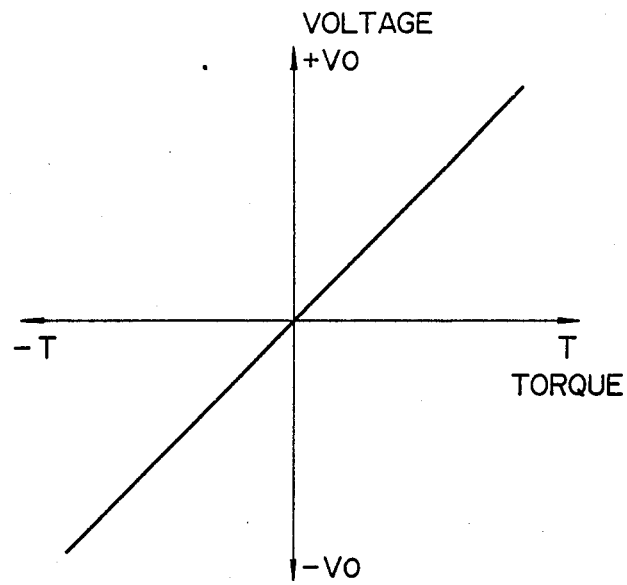
FIG. 3 is a graph showing the relationship between a torque and an output in the sensor shown in FIGS. 1 and 2.

Resistors 43 and 44 are preadjusted so that the output amplitude of differential amplifier 46 decreases to a minimum. When torque T is applied to shaft 11, amorphous magnetic metallic ribbons 12 and 13 on shaft 11 are distorted by the influence of torque T. As a result, the magnetic permeability of ribbons 12 and 13 is changed by the magnetostriction effect. As stated above, ribbons 12 and 13 have uniaxial magnetic anisotropy which facilitates magnetization in directions inclined by $\alpha$ and $-\alpha$ in respect to the axis of shaft 11. In the case where the angle $\alpha$ is about 45°, when torque T is applied to shaft 11, the axis of easy magnetization is changed to the direction of surface stress produced in shaft 11 by torque T. As shown in FIG. 1, when torque T is applied to shaft 11, a tensile stress is produced in ribbon 12 and a compressive stress is produced in ribbon 13. Thus, the magnetostriction effect is efficiently brought about in ribbons 12 and 13, so that the magnetic permeability of ribbon 12 increases and the magnetic permeability of ribbon 13 decreases. In accordance with a variation in permeability, the impedances of coils 28 and 29 change. As a result, as shown in FIG. 3, the output V0 of signal processing section 2 changes depending on the intensity and direction of torque T, and the torque applied to shaft 1 is sensed. The principle of detection in this type of torque sensor is described in detail in U.S. Pat. No. 4,627,298 (Sahashi, et al.).

Figure 4:
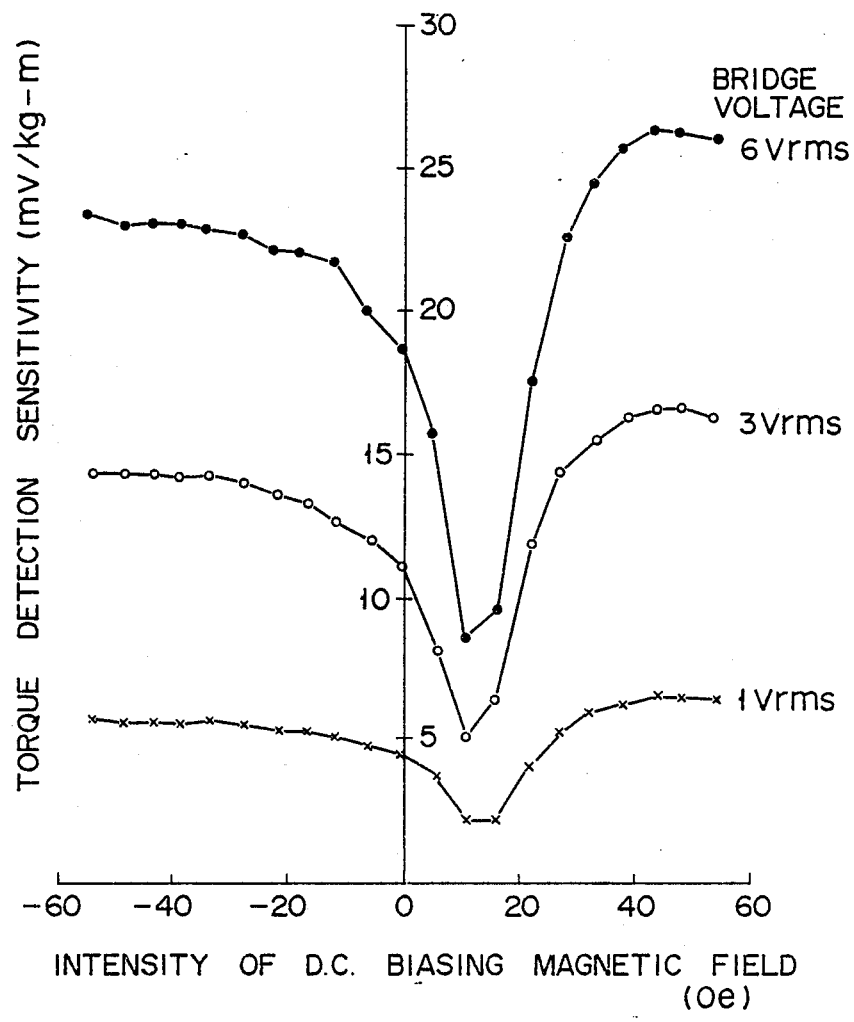
FIG. 4 is a graph showing the relationship between the intensity of a DC biasing magnetic field and a torque detection sensitivity.

The torque sensor shown in FIG. 1 is provided with biasing magnetic field applying source 17 which uses permanent magnets 22 and 24 as a magnetic field generation source. Since both permanent magnets 22 and 24 are magnetized along the shaft, the magnetic flux of permanent magnets 22 and 24 flows through a path including magnet 22, yoke 19, pole-face 18, shaft 11, pole-face 20, yoke 21, magnet 24, yoke 23 and permanent magnet 19. Thus, a DC biasing magnetic field, as well as a torque detection magnetic field, is applied to ribbons 12 and 13. The inventors confirmed by experiments that the application of DC biasing magnetic field can keep the detection sensitivity at a constant value. Namely, the dimensions of ribbons 12 and 13 are determined such that the width w of each of ribbons 12 and 13 in the axial direction of shaft 11 is set to be smaller than the length L of each of ribbons 12 and 13 in the circumferential direction of shaft 11 (W<L). FIG. 4 shows variations in torque detection sensitivity for torque T of a torque sensor, in which shaft 11 is formed of a ferromagnetic material or carbon steel for mechanical structure (JIS S45C) so as to have a diameter of 25 mm, when the intensity of the DC biasing magnetic field applied to ribbons 12 and 13 is changed. In FIG. 4, the abscissa indicates the intensity of the DC biasing magnetic field, and the ordinate indicates the torque detection sensitivity calculated in terms of the value of the signal input to differential amplifier shown in FIG. 2. As seen from FIG. 4, when the intensity and direction of the DC biasing magnetic field are changed, the torque detection sensitivity changes. Also, when the voltage applied to the bridge circuit is changed, the torque detection sensitivity changes. As shown in FIG. 4, when the intensity of the biasing magnetic field is close to zero, i.e., −10 to 30 Oe, the torque detection sensitivity changes greatly. In the case where an external disturbance magnetic field is applied as a biasing magnetic field, or shaft 11 is magnetized by an excessive current produced at the time of the operation of switch 52, the torque detection sensitivity of the torque sensor changes. In other words, even if the same torque is applied to shaft 11, the torque sensor produces detection outputs of different levels, which indicate that different torques are applied to shaft 11. On the other hand, as seen from FIG. 4 when a DC biasing magnetic field having an intensity of 40 Oe or above, the torque detection sensitivity is substantially constant and stable. In this case, if the intensity of the DC biasing magnetic field is set to −40 Oe or thereabouts, the torque detection sensitivity is unchanged even if an external magnetic field is applied or shaft 11 is magnetized. In FIG. 4, the torque detection sensitivity is lowest when a DC biasing magnetic field of +10 to +20 Oe is applied. This phenomenon is considered to result from the fact that the shaft is made of ferromagnetic material and is magnetized prior to the experiment, in consideration of the fact that the experiment was not performed under the condition in which an external disturbance magnetic field is applied to the sensor. In the case where the shaft is not magnetized or the shaft is made of non-magnetic material, the detection sensitivity is lowest at the value of 0 Oe or thereabouts.

Since biasing magnetic field applying source 17 is provided for applying a DC biasing magnetic field to amorphous magnetic metallic ribbons 12 and 13, the torque detection sensitivity can be kept substantially constant by the application of the DC biasing magnetic field having an intensity of a predetermined value or above. Therefore, the shaft torque can be precisely sensed.

Figure 5:
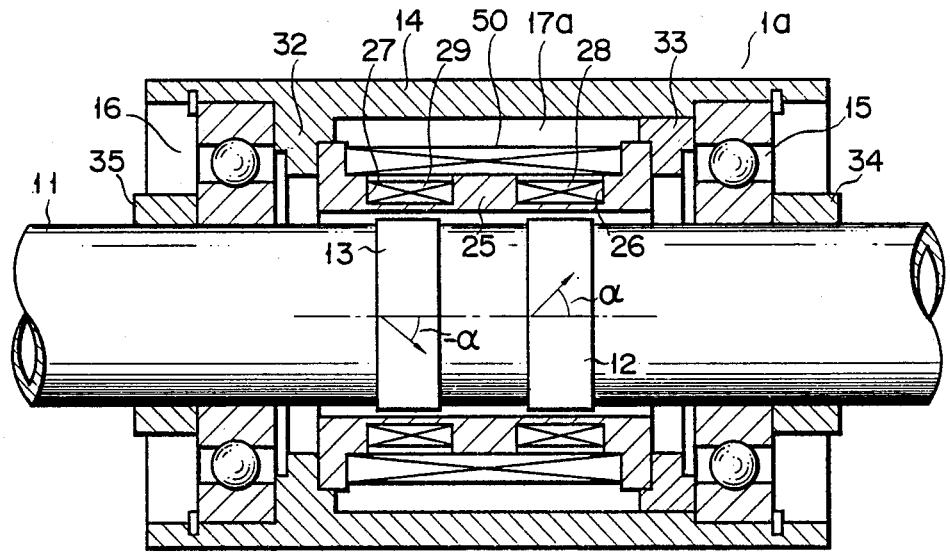
FIG. 5 is a vertical cross section of a detection section of a torque sensor according to another embodiment of the invention.
Figure 6:
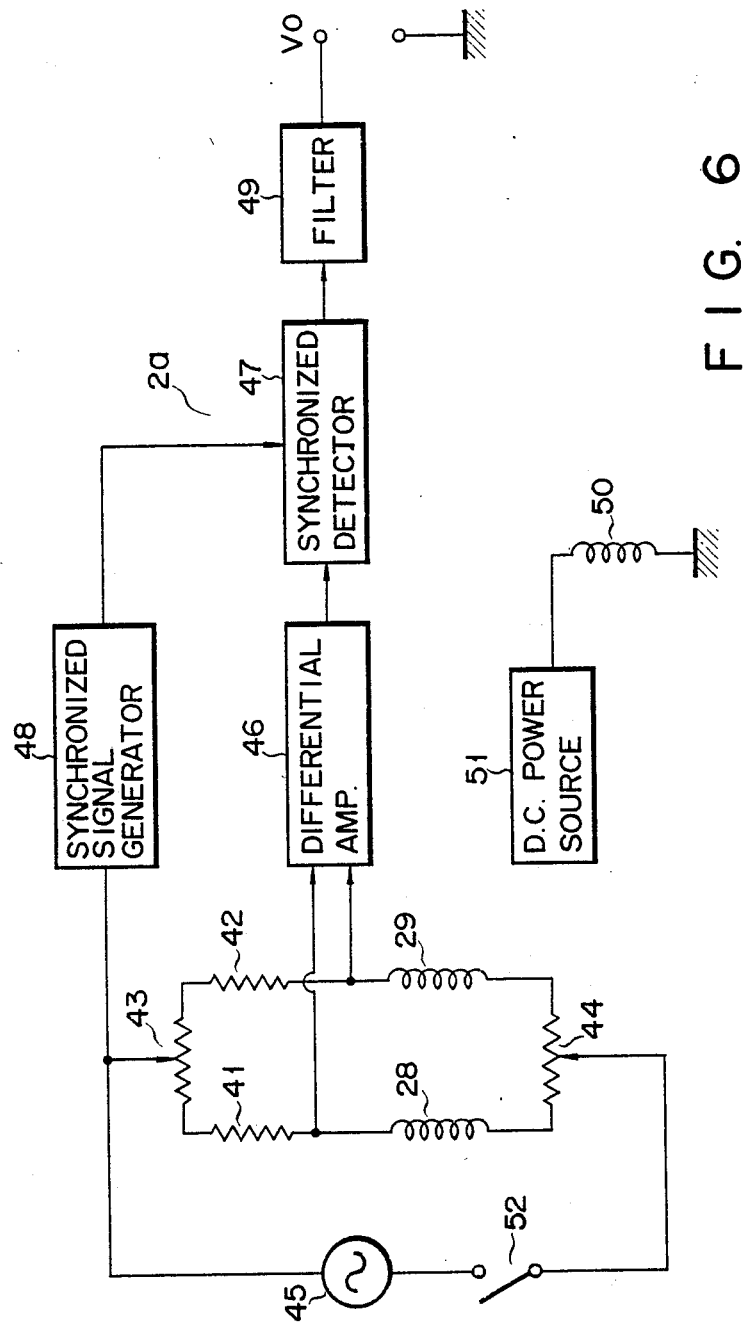
FIG. 6 shows a circuit structure of a signal processing section connected to the detection section shown in FIG. 5.

Another embodiment of the torque sensor of the present invention will now be described with reference to FIGS. 5 and 6. FIG. 5 shows detection section 1a of the torque sensor, and FIG. 6 shows signal processing section 2a of the torque sensor. In FIGS. 5 and 6, the reference numerals already used in FIGS. 1 and 2 denote the same elements as shown in FIGS. 1 and 2. A description of these elements may be omitted. The sensor shown in FIG. 5 is not provided with yoke 23, permanent magnet 22, or permanent magnet 24. Instead, in this sensor, coil 50 serving as biasing magnetic field applying source 17a for generating a biasing magnetic field is mounted on the outer peripheral surface of coil bobbin 25a. Signal processing section 2a is provided with DC power source 51 for exciting coil 50.

In this sensor, the same advantages as is obtained in the above embodiment can be obtained, since a desired DC biasing magnetic field can be applied to amorphous magnetic metallic ribbons 12 and 13.

In the above two embodiment, shaft 11 is made of ferromagnetic material and is made hollow. However, shaft 11 may be solid, and may be made of non-magnetic material. The magnetic field generation source of the biasing magnetic field applying source may have one permanent magnet, or three or more permanent magnets. An AC excitation coil may be provided to produce a potential difference between coils 28 and 29 as an output signal. The length of each amorphous magnetic metallic ribbon need not be the same as the circumferential length of the shaft. The bearings may be omitted, if the place of installation does not require them.

Since the torque sensor of the present invention is constituted as described above, the following advantages can be obtained.

The means for applying a DC biasing magnetic field is provided for applying a DC biasing magnetic field to amorphous magnetic metallic members mounted on the shaft. Thus, by setting the intensity of the biasing magnetic field to be applied to a predetermined value or above, a variation in detection sensitivity due to an external magnetic field can be prevented, and the detection sensitivity can be kept constant. Therefore, the torque can always be sensed precisely.

In addition, by using permanent magnets as main components of the means for applying the DC magnetic field, the sensor can be made more reliable, smaller in size, and easier in maintenance.

What is claimed is:

1. A torque sensor of a noncontact type for sensing a rotary torque applied to a shaft having an axis, the sensor comprising:
    a first magnetic ribbon fixed to the shaft along the circumferential direction of the shaft, said ribbon comprising a magnetic material having an induced magnetic anisotropy in a direction of an angle $\alpha$ in respect to the axis of the shaft;
    means for generating an alternating magnetic field along the shaft and applying the magnetic field to said magnetic ribbon;
    means for generating a constant biasing magnetic field along the shaft and applying the biasing magnetic field to said magnetic ribbon; and
    means for detecting the magnetic fields passing through said magnetic ribbon to generate an output signal.

2. The torque sensor according to claim 1, said sensor further comprising:
    a second magnetic ribbon arranged close to said first magnetic ribbon and fixed to the shaft along the circumferential direction of the shaft, said second ribbon comprising a magnetic material having an induced magnetic anisotropy in a direction of an angle $-\alpha$ in respect to the axis of the shaft.

3. The torque sensor according to claim 1, wherein said magnetic ribbon has a width W along the shaft and a length L along the circumferential direction of the shaft, the width W being smaller than the length L.

4. The torque sensor according to claim 1, wherein said magnetic ribbon surrounds the entire circumference of the shaft.

5. The torque sensor according to claim 1, wherein said biasing magnetic field generating means includes at least one permanent magnet for generating a biasing magnetic field.

6. The torque sensor according to claim 1, wherein said biasing magnetic field generating means includes at least one electromagnet for generating a biasing magnetic field.

7. The torque sensor according to claim 1, wherein said means for generating an alternating magnetic field includes an electromagnet for generating a high-frequency alternating magnetic field.

8. The torque sensor according to claim 1, wherein said detecting means includes a coil for detecting the magnetic field.

9. A torque sensor of a noncontact type for sensing a rotary torque applied to a shaft having an axis, the sensor comprising:
   a first amorphous magnetic ribbon fixed to the shaft along the circumferential direction of the shaft, said ribbon comprising a magnetic material having an induced magnetic anisotropy in a direction of an angle $\alpha$ in respect to the axis of the shaft
   means for generating an alternating magnetic field along the shaft and applying the magnetic field to said magnetic ribbon;
   means for generating a constant biasing magnetic field along the shaft and applying the biasing magnetic field to said magnetic ribbon; and
   means for detecting the magnetic fields passing through said magnetic ribbon to generate an output signal.

10. The torque sensor according to claim 9, said sensor further comprising:
    a second magnetic ribbon arranged close to said first magnetic ribbon and fixed to the shaft along the circumferential direction of the shaft, said second ribbon comprising a magnetic material having an induced magnetic anisotropy in a direction of an angle $-\alpha$ in respect to the axis of the shaft.

11. The torque sensor according to claim 9, wherein said magnetic ribbon has a width W along the shaft and a length L along the circumferential direction of the shaft, the width W being smaller than the length L.

12. The torque sensor according to claim 9, wherein said magnetic ribbon surrounds the entire circumference of the shaft.

13. The torque sensor according to claim 9, wherein said biasing magnetic field generating means includes at least one permanent magnet for generating a biasing magnetic field.

14. The torque sensor according to claim 9, wherein said biasing magnetic field generating means includes at least one electromagnet for generating a biasing magnetic field.

15. The torque sensor according to claim 9, wherein said means for generating an alternating magnetic field includes an electromagnet for generating a high-frequency alternating magnetic field.

16. The torque sensor according to claim 9, wherein said detecting means includes a coil for detecting the magnetic field.

17. A torque sensor of a noncontact type for sensing a rotary torque applied to a shaft which has an axis and is made of a magnetic material, the sensor comprising:
    a first magnetic ribbon fixed to the shaft along the circumferential direction of the shaft, said ribbon comprising a magnetic material having an induced magnetic anisotropy in a direction of an angle $\alpha$ in respect to the axis of the shaft;
    a second magnetic ribbon arranged close to said first magnetic ribbon and fixed to the shaft along the circumferential direction of the shaft, said second ribbon comprising a magnetic material having an induced magnetic anisotropy in a direction of an angle $-\alpha$ in respect to the axis of the shaft;
    means for generating an alternating magnetic field along the shaft and applying the magnetic field to said magnetic ribbons;
    means for generating a constant biasing magnetic field along the shaft and applying the biasing magnetic field to said magnetic ribbons; and
    means for detecting the magnetic fields passing through said magnetic ribbons to generate an output signal.

18. The torque sensor according to claim 17, wherein each of said magnetic ribbons has a width W along the shaft and a length L along the circumferential direction of the shaft, the width W being smaller than the length L.

19. The torque sensor according to claim 17, wherein each of said magnetic ribbons surrounds the entire circumference of the shaft.

20. The torque sensor according to claim 17, wherein said biasing magnetic field generating means includes at least one permanent magnet for generating a biasing magnetic field.

21. The torque sensor according to claim 17, wherein said biasing magnetic field generating means includes at least one electromagnet for generating a biasing magnetic field.

22. The torque sensor according to claim 17, wherein said means for generating an alternating magnetic field includes an electromagnet for generating a high-frequency alternating magnetic field.

23. The torque sensor according to claim 17, wherein said detecting means includes a coil for detecting the magnetic field.

* * * * *